No. 890,413.
PATENTED JUNE 9, 1908.
G. A. DEJUNG.
ANIMAL TRAP.
APPLICATION FILED APR. 11, 1908.
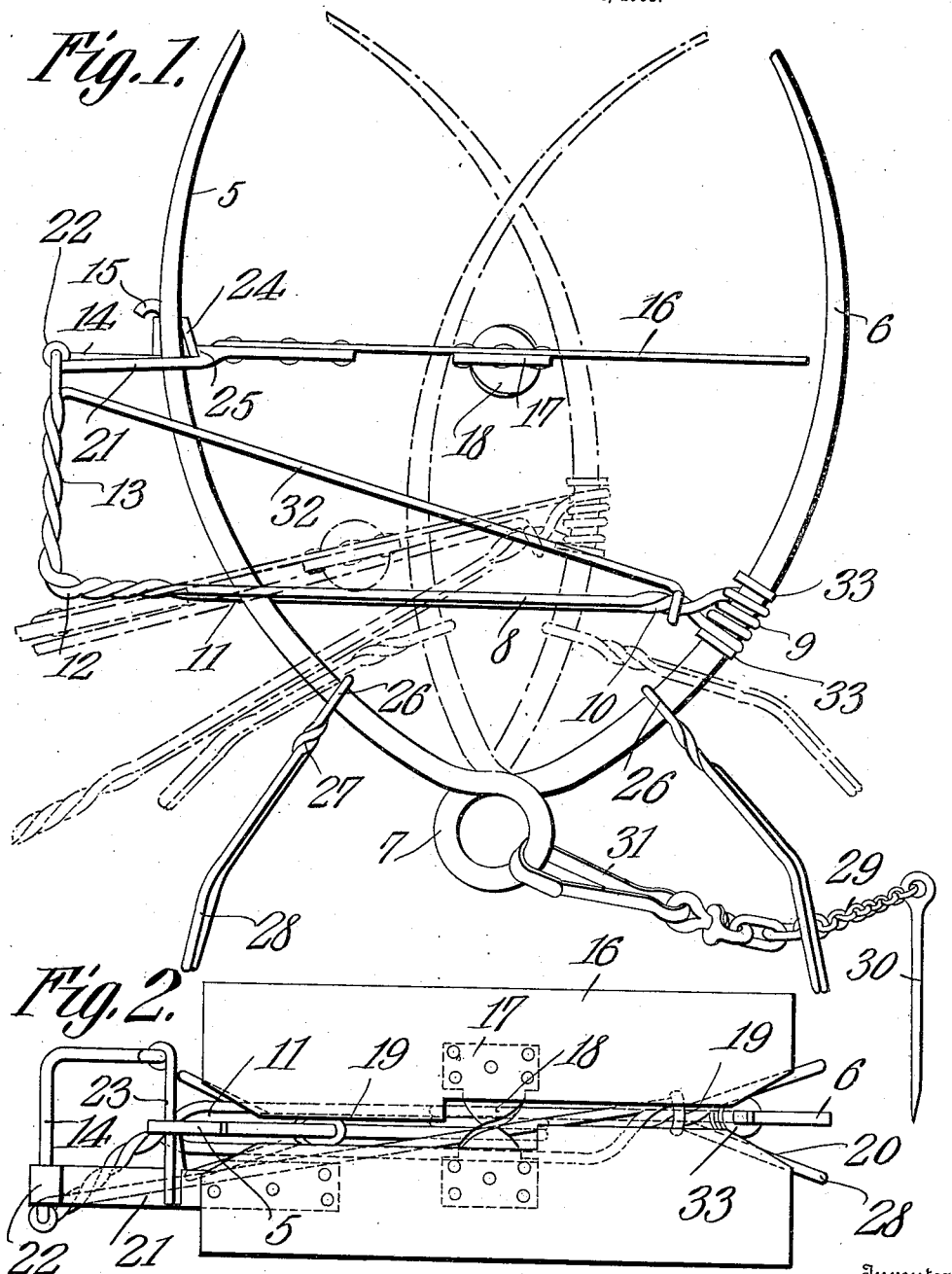
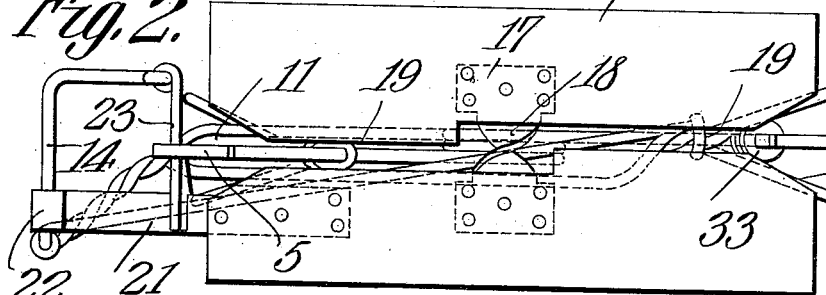
Witnesses
Inventor
Gottlieb A. Dejung.
By C. A. Snow & Co
Attorneys

UNITED STATES PATENT OFFICE.

GOTTLIEB A. DEJUNG, OF CAMERON, WISCONSIN.

ANIMAL-TRAP.

No. 890,413.      Specification of Letters Patent.      Patented June 9, 1908.

Application filed April 11, 1908. Serial No. 426,584.

*To all whom it may concern:*

Be it known that I, GOTTLIEB A. DEJUNG, a citizen of the United States, residing at Cameron, in the county of Barron and State of Wisconsin, have invented a new and useful Animal-Trap, of which the following is a specification.

This invention relates to animal traps and has for its object to provide a comparatively simple and inexpensive device of this character especially designed for trapping weasels, musk-rats and other animals.

A further object of the invention is to provide an animal trap having a pivoted pan or platform and provided with spring pressed impaling jaws normally held in open position by a pivoted trigger, said trigger being operatively connected with the pivoted end of the platform so that when an animal steps on the platform the weight of the animal will depress the platform and thereby cause the jaws to impale the animal and effectually prevent the escape of the same, without danger of injuring the fur of said animal.

A still further object of the invention is generally to improve this class of devices so as to increase their utility, durability and efficiency as well as to reduce the cost of manufacture.

Further objects and advantages will appear in the following description, it being understood that various changes in form, proportions and minor details of construction may be resorted to within the scope of the appended claims.

In the accompanying drawings forming a part of this specification: Figure 1 is a side elevation of an animal trap constructed in accordance with my invention. Fig. 2 is a top plan view of the same.

Similar numerals of reference indicate corresponding parts in all of the figures of the drawings.

The improved trap forming the subject matter of the present invention includes spaced impaling jaws 5 and 6 preferably formed of a single piece of heavy galvanized wire or other suitable material an intermediate portion of which is bent to produce a centrally disposed spring coil 7.

Secured to the lower end of the impaling jaw 6 is a horizontally disposed bar 8, also preferably formed of a single piece of wire, an intermediate portion of which is coiled around the jaw 6, as indicated at 9, and thence twisted at 10 to form spaced parallel members defining an intermediate slot 11 for the reception of the impaling jaw 5, the strands of wire after the loop 11 is formed being intertwisted at 12 and thence extended upwardly to form a vertically disposed arm 13.

One end of the strand of wire constituting the arm 13 is extended laterally beyond the adjacent strand, at the intertwisted portion 12, to form a horizontally disposed arm 14 the terminal of which is bent inwardly and thence outwardly to form an over-hanging hook 15.

Interposed between the impaling jaws 5 and 6 is a pivoted platform or pan 16 preferably formed of a pair of flat sheet metal plates spaced apart by a connecting bar 17 having its intermediate portion twisted at 18 in order to strengthen the same, as shown. The adjacent longitudinal edges of the plates comprising the pan 16 are cut away to produce between them longitudinally disposed guide slots 19, preferably arranged out of alinement with each other and adapted to receive the jaws 5 and 6 when the trap is sprung, the staggered relation of the slots permitting the jaws to pass each other, as shown. The opposite ends of the plates are also preferably inclined in the direction of the adjacent longitudinal slots 19, as indicated at 20, in order to assist in guiding the impaling jaws within the same when the latter are moved to closed or operative position.

Secured to one end of the pan 16 is a bar or shank 21, the free end of which extends on one side of the jaw 5 and is coiled to produce an eye or loop 22 for the reception of the horizontally disposed arm 14 whereby the pan or platform is free to swing on said arm.

Pivotally mounted on the overhanging hook 15 is a horizontally disposed trigger 23 which extends in front of the impaling jaw 5, when the trap is set, and is provided with a laterally inclined portion 24 adapted to bear against a shoulder 25 on the shank 21 of the platform thereby to hold the impaling jaws in open or inoperative position.

Slidably mounted on the jaws 5 and 6, at a point adjacent the intermediate spring coil 7, are depending supporting members each preferably formed of a single piece of wire having its intermediate portion coiled to form an eye 26 for the reception of the adjacent jaws, the wire being thence intertwisted at 27 and extended laterally to form spaced depending feet 28 adapted to be embedded or partially embedded in the ground thereby to support the trap in vertical position. A chain or cable 29 is also preferably employed to assist in anchoring the trap. One end of the chain 29 is fastened to a stake 30 adapted to be driven into the ground while the opposite end of the chain is secured to a swivel carrying a snap hook 31 adapted to engage either the loop 7 or the arm 13.

The member 8 is reinforced and strengthened by a diagonal brace wire 32 preferably formed integral with said member and which extends from the twisted portion 10 to the upper end of the arm 13.

Suitable collars 33 are secured to the jaws 6 on opposite sides of the coil 9 in order to prevent accidental displacement of the member 8 and its associated parts.

In using the trap the latter is placed in a stream with the legs 28 embedded in the bed of the stream and with the trigger 23 extending in front of the jaw 5 and engaging the shoulder 25 of the shank 21, as best shown in Fig. 1 of the drawings, the pan or platform being preferably submerged in the water.

When the animal steps on the platform 16 the weight of the animal will depress said platform, thus releasing the trigger 23 and causing the coil spring 7 to move the clamping jaws to closed position and impale the animal, so as to effectually prevent escape of the same.

If desired the free ends of the impaling jaws may be covered with reeds or wrapped with birch bark.

By adjusting the supporting members or legs longitudinally of the clamping jaws the height of the trap may be regulated at will while the overhanging hook 15 serves to lock the trigger 23 against accidental displacement.

While the device is principally designed for trapping weasels and musk-rats it is obvious that the same may be used for trapping other animals or wherever a device of this character is found desirable.

Having thus described the invention what is claimed is:

1. An animal trap including spring pressed impaling jaws, a support secured to one of said jaws and provided with an angularly disposed arm, a platform pivotally mounted on the arm, and a trigger extending in front of one of the jaws and bearing against the platform near the pivoted end thereof for locking the jaws in open position.

2. An animal trap including spring pressed impaling jaws, a bar secured to one of the jaws and having an elongated slot formed therein for the reception of the adjacent jaw, said bar being provided with a laterally extending arm, a platform pivotally mounted on said arm and having longitudinally disposed slots formed therein for the reception of the jaws, and a trigger extending in front of one of said jaws and bearing against the platform near the pivoted end thereof for locking the jaws in open position.

3. An animal trap including spring pressed jaws, a bar secured to one of said jaws, and having a slot formed therein for the reception of the adjacent jaw, the free end of said bar being provided with a laterally extending arm terminating in an over-hanging hook, a platform pivotally mounted on the arm and having elongated slots formed therein for the reception of the jaws, and a trigger pivotally mounted on the hook and extending in front of one of the jaws for engagement with the platform near the pivoted end thereof thereby to lock the jaws in open position.

4. An animal trap including spring pressed impaling jaws connected by an intermediate coil, supporting feet carried by the jaws, a bar secured to one of said jaws and having a slot formed therein for the reception of the adjacent jaw, the free end of said arm being provided with a laterally extending arm terminating in an over-hanging hook, a platform pivotally mounted on said arm and having longitudinal slots formed therein for the reception of the jaws, and a trigger pivotally mounted on the hook and extending in front of one of the jaws for engagement with the platform near the pivoted end thereof thereby to lock the jaws in open position.

5. An animal trap including spring pressed impaling jaws, a bar formed of a single piece of wire having an intermediate portion thereof coiled around one of the jaws and thence intertwisted and spaced apart to form an elongated slot for the reception of the adjacent jaw, the wire being thence intertwisted and extended upwardly to form a vertically disposed arm, one end of the wire after the arm is formed being extended laterally to produce a horizontally disposed arm terminating in an over-hanging hook, a pan pivotally mounted on the horizontal arm and having longitudinal slots formed therein for the reception of the jaws, and a trigger pivotally mounted on the over-hanging hook and extending in front of one of the jaws for engagement with the platform near the pivoted end thereof thereby to hold the jaws in open position.

6. A trap including spring pressed jaws connected by an intermediate coil, a bar secured to one of the jaws and provided with a vertically disposed arm, the end of which is bent laterally to form a horizontally disposed arm terminating in an over-hanging hook, a platform pivotally mounted on the horizontally disposed arm and having spaced longitudinal slots formed therein for the reception of the jaws, the walls of said slots at the opposite ends of the platform being inclined towards the center thereof, and a trigger pivotally mounted on the over-hanging hook and extending in front of the adjacent jaw and bearing against the platform near the pivoted end thereof for locking the jaws in open position.

7. A trap including spring pressed jaws, a support secured to one of the jaws and provided with an angularly disposed arm, a platform pivotally mounted on the arm and provided with longitudinal slots arranged out of alinement with each other and adapted to receive the jaws when the trap is sprung, and a trigger extending in front of one of the jaws and adapted to bear against the platform near the free end thereof.

8. A trap including spring pressed jaws, a support secured to one of the jaws and provided with an arm terminating in a hook, a platform comprising spaced plates each having one longitudinal edge thereof cut away and forming in connection with the cut away portion of the mating plate longitudinal slots arranged out of alinement with each other, a bar connecting the plates of the platform and having its intermediate portion twisted, a shank carried by the platform and having one end thereof pivoted to the arm and its intermediate portion provided with a shoulder, and a trigger pivoted to the hook and having its free end inclined laterally for engagement with the shoulder.

In testimony that I claim the foregoing as my own, I have hereto affixed my signature in the presence of two witnesses.

GOTTLIEB A. DEJUNG.

Witnesses:
 THEO. J. DEJUNG,
 C. H. MUSEUS.